May 7, 1968   J. E. EDGELL   3,381,916
TAPE RULE CASE AND BRAKE CONSTRUCTION
Filed June 29, 1966   2 Sheets-Sheet 1
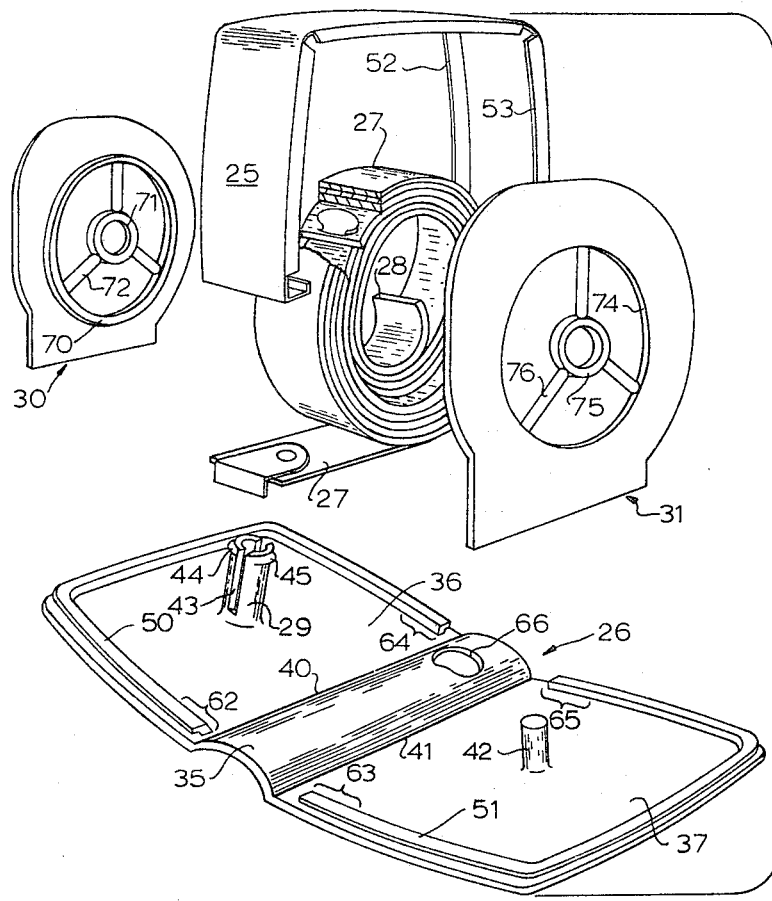
FIG. 1
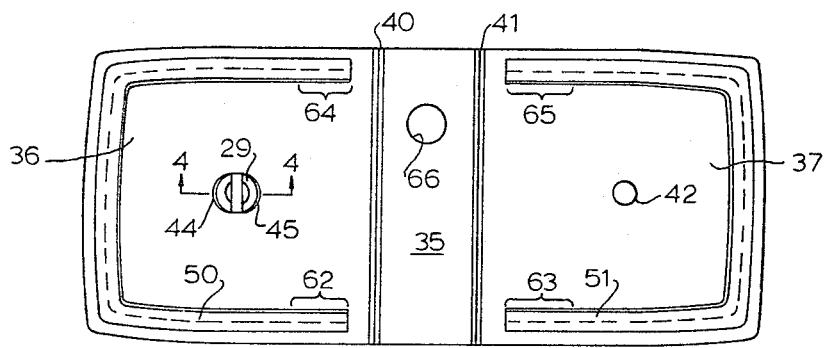
FIG. 3
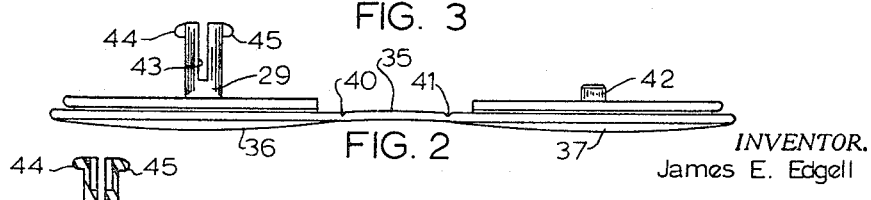
FIG. 2
FIG. 4
INVENTOR.
James E. Edgell
BY
B. B. Olive
ATTORNEY May 7, 1968   J. E. EDGELL   3,381,916
TAPE RULE CASE AND BRAKE CONSTRUCTION
Filed June 29, 1966   2 Sheets-Sheet 2
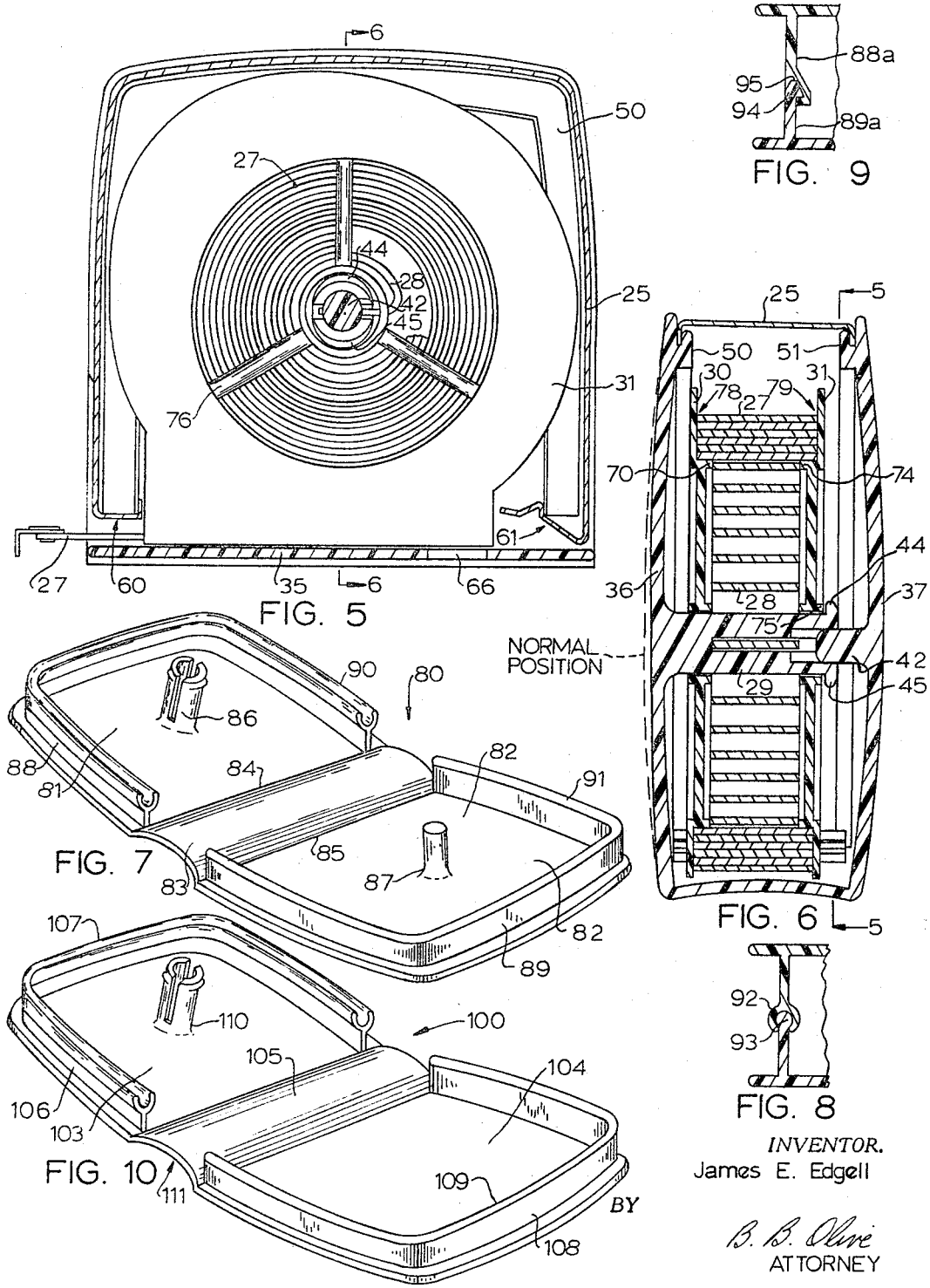
INVENTOR.
James E. Edgell
BY
B. B. Olive
ATTORNEY United States Patent Office 3,381,916
Patented May 7, 1968

3,381,916
TAPE RULE CASE AND BRAKE
CONSTRUCTION
James E. Edgell, Wexford, Pa., assignor to H. K. Porter Company, Inc. (Delaware), Pittsburgh, Pa., a corporation of Delaware
Filed June 29, 1966, Ser. No. 561,567
11 Claims. (Cl. 242—107.3)

ABSTRACT OF THE DISCLOSURE

A tape rule employs flexible side walls and complementary internal braking means such that normal positioning of the side walls tends to brake the tape and squeezing of the side walls tends to release the tape. Integral housing constructions which can be snap-fastened together are disclosed.

---

Characteristics of conventional tape rules which concern the present invention relate to the construction of the housing and internal operating mechanism and particularly the means to brake or hold the withdrawn tape at a particular position. Considering first the matter of housing construction it has been almost a universal practice to make the housing from a pair of cast metal half sections which mate and which are usually held together by a plurality of screws and sometimes by rivets. Since the steel tape itself is relatively heavy the overall construction is relatively heavy and the cast half sections are subject to breakage. Furthermore, considerable time is required to assemble the housing with screws, rivets or the like.

Considering next the matter of the tape brake mechanisms, it has long been recognized that carpenters, cabinet makers and other operators of tape rules need some means for holding the tape rule at various withdrawn positions while measurements are being taken or checked or the same measurement transferred to various pieces of material. Various brake mechanisms have been devised one of the most popular being the push-button type as shown, for example, in U.S. Patent 3,114,515. While such brake mechanisms have given satisfactory performance, the same general construction has been retained namely that of employing mating, cast metal, half sections for the housing and screws or other means to hold the half sections together.

An object is to provide an improved, economical housing construction for a tape rule and which is not easily subject to damage.

Another object is to provide an improved tape rule brake.

Another object is to provide a tape rule having a resilient housing such that pressure on the housing members may be employed to control braking of the tape rule.

Another object is to provide a tape rule case construction which can be assembled without screws or similar fastening means.

Another object is to provide a tape rule having a brake mechanism but which does not require employment of an exposed push-button.

The foregoing and other objects will become apparent from the description and drawings, in which:

FIGURE 1 is an exploded view of a tape rule embodying the invention and adapted to inside direct reading.

FIGURE 2 is an elevation view of an integral sidecase member.

FIGURE 3 is a plan view of the sidecase.

FIGURE 4 is a section view of the post along line 4—4 of FIGURE 3.

FIGURE 5 is an elevation, partially sectioned, view of the assembled rule taken along line 5—5 of FIGURE 6.

FIGURE 6 is an end elevation assembly view along line 6—6 of FIGURE 5.

FIGURE 7 is a perspective view of the alternate sidecase.

FIGURE 8 is a fragmentary section view of the sidecase closure.

FIGURE 9 is a fragmentary section view of an alternate closure.

FIGURE 10 is a perspective view of a sidecase with one post.

Before proceeding to the detailed description, a general explanation of the invention will be given. In the embodiment of the invention which is disclosed the recoil spring which can be of the usual construction mounts on a slotted post. This post is formed as an integral part of what is called the sidecase. This entire structure is formed of a suitable plastic. The sidecase forms the bottom wall and the two side walls in the assembled rule. The side case is held together by a clip which snaps in place over the sidecase and the tape is connected to the recoil spring.

In addition to containing the recoil spring, the tracking arrangement and the recoil spring mouting post, the interior of the rule also contains a pair of what are referred to as left and right pressure plates. These pressure plates may also be molded of a plastic such as nylon and they mount on the post on opposite sides of the tape such that they can be forced together to engage the edge of the tape and thereby brake the tape at any desired position. When the rule is assembled these pressure plates will assume a position which causes them to assert a braking pressure against the edges of the tape. The sidecase and other members of the rule are so arranged however that this pressure can be released by squeezing the sides of the rule somewhat like pushing in on the bottom of an oil can. Thus, the operator can squeeze the sides of the case to release the pressure plates and free the tape for easy withdrawal and when the tape has been pulled out to some desired postion, the operator can allow the sides to resume their normal position whereupon the tape will be braked and held.

The foregoing is now referred to in more detail in reference to the drawings. What is conventionally regarded as the housing of the rule is made up in the present invention from an assembly of a clip 25 to a sidecase 26. A recoil spring 28 which may be of the usual construction is mounted on a post 29 forming an integral part of sidecase 26 and a measuring tape 27 connects to spring 28. A left pressure plate 30 and a right pressure plate 31 of similar construction mount on post 29 on opposite sides of the tape 27. The described parts, namely clip 25, sidecase 26, recoil spring 28, tape 27 and the pressure plates 30, 31 are all those required from which the simplicity of the invention is immediately recognized.

Referring next to the details of the principal parts just described it will be noted that the sidecase 26 includes a bottom wall 35, a left side wall 36 and a right side wall 37. Sidecase 26 is preferably formed of a plastic such as polypropylene or polyethylene which enables walls 35, 36 and 37 to be molded as an integral piece and by utilizing relatively thin lines of juncture as indicated at 40, 41 the bottom wall 35 is effectively hinged to side walls 36 and 37. Such a hinging effect by use of plastic is sometimes referred to in the trade as being a "living hinge." The previously referred to post 29 mounts centrally of left side wall 36 and is hollow so as to receive a mating stud 42 which aligns the two case halves during assembly and prevents the post 29 from collapsing after assembly. It will also be noted that post 29 is provided with a slot 43 which receives the end of the recoil spring 28. The end of post 29 is provided with projections as indicated at 44 and 45 (FIGURES 1 and 4).

The left side wall 36 of sidecase 26 is provided with an inverted U-shaped rib 50 and the right side wall 37 is provided with a similar rib 51. It will also be noticed that clip 25 is provided with inverted U-shaped lips 52 and 53, the latter being designed to engage the respective ribs 50, 51 so as to provide a means for holding the side walls 36, 37 in their respective positions. That is, when clip 25 is assembled to sidecase 26, the ribs 50, 51 are brought into locking engagement with the respective lips 52, 53. Clip 25 will also be noted as having a front clip section 60 and a rear clip section 61. In final assembly the front clip section 60 is secured under the bottom and lower portions of the front vertical runs of ribs 50, 51 so as to engage the rib portions indicated at 62, 63. At the same time the rear clip section 61 is snapped in place to engage the bottom and lower portions of the rear vertical runs of ribs 50, 51 so as to engage the rib portions indicated at 64, 65. A hole 66 is provided in the bottom wall 35 to provide a means for disengaging the rear clip section 61 so as to be able to disassemble the rule once it has been assembled. A suitable labelling tape, not shown, may be used to cover hole 66. That is, once clip 25 and sidecase 26 are assembled by means of the lips 52, 53 of clip 25 engaging the ribs 50, 51 of sidecase 26 and the front clip section 60 and rear clip section 61 of clip 25 engaging the respective rib portions 62, 63 and 64, 65 the rule will remain assembled since clip 25 is effectively locked to sidecase 26. However, clip 25 can be quickly disassembled by employing a screwdriver or the like in hole 66 for prying the rear clip section 61 loose from its assembled position.

It will of course be understood that the recoil spring 28, the tape 27 and the pressure plates 30, 31 are assembled within sidecase 26 before sidecase 26 and clip 25 are snapped together. Considering the left pressure plate 30 it will be noted that plate 30 includes a raised circular rib 70 surrounding a hub 71 supported by spokes 72. The right pressure plate 31 also includes a raised circular rib 74 surrounding a hub 75 supported on spokes 76. In assembly the hub 71 of plate 30 is forced over the enlarged tip of post 29 and is moved to the base of post 29. The assembly of recoil spring 28 and tape 27 is next installed with the end of spring 28 engaging the slot 43 of post 29. The right pressure plate 31 is next installed by forcing hub 75 over the tip of post 29.

After the right pressure plate 31 has been snapped over the enlarged end of post 29, the sidecase 26 is folded into a U-shape so that stud 42 on wall 37 is aligned with and forced into the hole in post 29. The diameter of stud 42 is such that it prevents post 29 from collapsing once stud 42 has been installed in post 29. That is, the enlarged portions 44, 45 of post 29 are held outwardly which prevents the parts previously installed on post 29 from being released from the post. After the sidecase 26 has been folded and stud 29 installed as described clip 25 is fitted with its lips 52, 53 and front and rear clip sections 60, 61 engaging ribs 50, 51 as previously discussed in such a manner as to keep the whole assembly locked together.

Of particular interest to the invention is the braking assembly and its manner of operation. In general, it can be said that in the assembled rule the pressure plates 30, 31 normally apply pressure to the edges of the tape 27 and this pressure can be released by pressing or squeezing on the walls 36, 37. This action is explained as follows and is believed to best be seen in FIGURE 7. Walls 36 and 37 are seen to be formed so that they bulge outwardly and due to the nature of the plastic material employed they each have a natural spring action very much like the action of the bottom of an oilcan. That is, somewhat like the push-button action found, for example, in the referred-to Patent 3,114,515 the walls 36, 37 tend to spring back and bulge outwardly whenever they are squeezed and released. Within the assembly, it can also be seen that the edges of the recoil spring 28 will reside against the respective spokes and ribs of the pressure plates 30, 31 and that the tape 27 is coiled around the respective ribs of the pressure plates and has its edges engaging the respective inside surfaces of the pressure plates as indicated, for example, at 78, 79 in FIGURE 7. Thus, when the pressure plates are pushed towards one another a gripping or braking force is asserted on the edges of tape 27 by the pressure plates. The length of post 29 is designed so that the tape 27 is normally clamped between the pressure plates 30, 31 and the left pressure plate 30 is held against the rib 50 of the left wall 36 of sidecase 26. When the walls of the sidecase 26 are squeezed together the braking action is released and the pressure plates are given some play or freedom to move on post 29. Stated differently, the "working length" of post 29 is increased whenever the walls of sidecase 26 are squeezed together and thus the braking action is controlled simply by squeezing and releasing the side walls of sidecase 26.

It is contemplated that an integral tape rule housing incorporating most of the features of the combination side case and clip may be provided and which is illustrated by FIGURES 7, 8 and 9. The tape rule housing of this second embodiment is referred to by the reference numeral 80 and includes a left side wall 81, a right side wall 82 and a bottom wall 83 which integrally connects left and right side walls 81 and 82 to form a composite housing. In effect, left and right side walls 81 and 82 are pivotally mounted on bottom wall 83 by means of "living hinges" 84 and 85, respectively. Housing 80 is preferably formed from a deformable and resilient plastic such as polypropylene or polyethylene. Left side wall 81 is provided with a post 86 which is integrally mounted in the center thereof and right side wall 82 mounts a mating stud 87, post 86 and stud 87 being identical in design and function to the previously described post 29 and stud 42. Left side wall 81 is provided with an inverted U-shaped inwardly projecting flange 88 which extends along the peripheral edges thereof and right side wall 82 is provided with a similarly positioned and mating flange 89. Flanges 88 and 89 respectively include on their exposed edges 90 and 91 fastening means which may be brought together in locking engagement. The fastening means may be a ball and socket joint as shown in FIGURES 7 and 8 in which the socket 92 comprises edge 90 of flange 88 and the ball is substantially a rail 93 which comprises edge 91 of flange 89. Thus, left side wall 81 and right side wall 82 may be brought into locking engagement by pressing rail 93 into socket 92. An alternative fastening means may be of the flush parting joint type as shown in FIGURE 9 whereby flange 89a has its peripheral edge shaped in the form of a wedge 94 and flange 88a has its peripheral edge defining a wedge shaped groove 95. Thus, flanges 88a and 89a may be brought into locking engagement by inserting wedge 94 into wedge shaped groove 95.

It is further contemplated that the tape rule housing structure of this invention may be constructed without the tape braking means. Such a construction would consist only of a tape rule case 100 as shown in FIGURE 10, a conventional coil spring and a conventional measuring tape. (The spring and tape are not shown in FIGURE 10; however, they are considered to be the equivalents of tape 27 and spring 28.) Tape rule case 100 includes a left side wall 103, a right side wall 104, and a bottom wall 105 which interconnects left and right side walls 103 and 104. Left side wall 103 is provided with a flange 106 having a grooved exposed edge 107 and right side wall 104 has extending outwardly therefrom flange 108 which has its outer edge shaped in the form of a rail 109. Rail 109 is adapted to be brought into locking engagement with grooved edge 107 in the manner as has previously been described. Left side wall 103 has integrally mounted thereon a slotted post 110 which is adapted to securely receive one end of the coil spring. The coil spring, which is connected at one end to one end of the measuring tape, and the measuring tape are wound about slotted post 110 so that the free end of the measuring tape extends through an opening 111 which is defined by bottom wall 105 and flanges 106 and 108 when rail 109 and grooved edge 107 are in locking engagement. While this embodiment does not have a tape braking means, it has the advantage of being basically fundamental with the minimum parts. Tape rule case 100 may be made of any material; however, it is contemplated that it will be molded from polyethylene, polypropylene or the like so that left and right side walls 103 and 104 are connected to bottom wall 105 by means of a "living hinge" as previously described.

From the foregoing, it can be seen that the invention provides both a simple, economical and reliable case and brake construction. While a specific embodiment has been illustrated, various modifications will appear to those skilled in the art. For example, the side of the case opposite the post side may be made relatively rigid and the side squeeze braking effect still retained. Various modifications of the braking plates are contemplated. Therefore, the following claims are expected to be construed within the spirit and scope of the invention.

Having described the invention, what is claimed is:

1. In a flexible tape rule, in combination:
   (a) a case including a tape slot, bottom, top, front, rear and side walls, at least one of said side walls being resilient;
   (b) post means fixedly mounted within said case on and extending from one of said side walls;
   (c) a tape retracting spring coiled in said case around said post means and having one end fixed thereto;
   (d) a measuring tape coiled around said spring and having one end connected thereto and the other end extending through said slot; and
   (e) tape braking means mounted internally of said case and engaging an edge of said tape, said braking means being arranged for positioning by said resilient wall and having a braking effect which is dependent upon such positioning, inwardly movement of said resilient wall being effective to release said tape and outwardly movement and normal positioning of said resilient wall being effective to brake said tape.

2. In a flexible tape rule as claimed in claim 1 wherein both said side walls are resilient and said positioning is effected by squeezing both said side walls.

3. In a flexible tape rule as claimed in claim 1 wherein said bottom and side walls are formed as an integral unit of non-rigid resilient material and including a clip member forming said top, front and rear walls, said side walls and clip member having releasable interengaging connections around the peripheries thereof effective to maintain the respective positions of said side walls.

4. In a flexible tape rule as claimed in claim 1 wherein said bottom and side walls comprise an integral case member formed of a non-rigid resilient material and having flexible joints at the respective junctions of said bottom and side walls, said braking means includes a pair of braking plates slidably mounted on said post means and engaging opposite edges of said tape, said post means includes restraining means effective to limit the outward travel of said plates on said post means, said inwardly movement being effective to increase the limits of travel of said plates on said post means and to release said tape and said outwardly movement and normal positioning being effective to limit said travel and brake said tape, and including a clip member forming said top, front and rear walls, said side walls and clip having releasable interengaging connections around the peripheries thereof effective to maintain the respective positions of said side walls.

5. In a flexible tape rule as claimed in claim 4 wherein said post means is hollow, said restraining means comprises an integral enlargement of the outward end of said post means and including a further post member mounted on a said side wall opposite to said post means and arranged to enter said hollow post means and provide support for said enlargement.

6. In a flexible tape rule of the type having a housing, a retracting spring and a connected measuring tape coiled within said housing, in combination:
   (a) an integral case member providing unbroken side walls and the bottom wall of said housing, said case member being formed of a non-rigid resilient material and being flexibly joined at the respective junctions of said walls; and
   (b) an integral substantially rigid clip member providing the front, top and rear walls of said housing and forming a slot for said tape; said clip member and side walls being formed with releasable continuous interengaging connections around the peripheries thereof and being effective to maintain fixed the respective peripheries of said resilient side walls while allowing sufficient movement in the central portions thereof to effect internal braking of said tape.

7. In a flexible tape rule, the combination:
   (a) an integral case member including a tape slot and having a bottom wall, left and right resilient unbroken side walls having selected edges thereof flexibly and integrally connected to said bottom wall, said side walls adapted to be folded along said selected edges into facing parallel planes, said left and right side walls having a pair of aligned flanges integrally formed with and connected to the respective facing surfaces thereof, said flanges having continuously interengaging edge formations and being effective to form end and top walls of said case member and enabling the peripheries of said resilient side walls to maintain relatively fixed positions while allowing sufficient movement in the central portions thereof to effect internal braking of said rule;
   (b) post means mounted within said case and being formed integral with and extending from one of said side walls;
   (c) a tape retracting spring coiled in said case around said post means and having one end fixed thereto; and
   (d) a measuring tape coiled around said spring and having one end connected thereto and the other end extending through said slot.

8. The flexible tape rule of claim 7 including tape braking means mounted internally of said case member and engaging an edge of said tape, said braking means being arranged for positioning by flexing of one of said resilient walls and having a braking effect which is dependent upon such positioning, inwardly movement of said resilient wall being effective to release said tape and outwardly movement and normal positioning of said resilient wall being effective to brake said tape.

9. The flexible tape rule of claim 8 wherein said braking means includes a pair of braking plates slidably mounted on said post means and engaging opposite edges of said tape, said post means includes restraining means effective to limit the outward travel of said plates on said post means, said inward movement being effective to increase the limits of travel of said plates on said post means and to release said tape and said outward movement and normal positioning being effective to limit said travel and brake said tape.

10. The flexible tape rule of claim 9 wherein said post means is hollow, said restraining means comprises an integral enlargement of the outward end of said post means and including a further post member mounted on a side wall opposite to said post means and arranged to enter said hollow post means and provide support for said enlargement.

11. A snap-fit housing for a flexible tape rule and associated recoil spring comprising a single integral case member providing defined bottom, top, end and unbroken side walls; a slotted post mounted within said housing and formed integral with one of said side walls, said post being adapted to mount said spring; and releasable snap fit interengaging connecting means formed integral with selected mating edges of said walls, said walls being integrally joined and foldable along selected junctures thereof to form said housing and bring said connecting means into engagement to secure said walls along said edges.

References Cited

UNITED STATES PATENTS

| | | | |
|---|---|---|---|
| 1,799,044 | 3/1931 | Farrand | 242—84.8 |
| 2,031,501 | 2/1936 | Porter | 242—99 |
| 2,510,939 | 6/1950 | Carlson | 242—107.3 |
| 2,599,320 | 6/1952 | Dart | 242—107.3 |
| 3,107,783 | 10/1963 | Corey et al. | 220—315 XR |
| 3,127,989 | 4/1964 | Travaglio | 242—55.53 |
| 3,149,747 | 9/1964 | Burgess | 220—60 |
| 3,198,175 | 8/1965 | Dean | 242—99 X |
| 3,255,977 | 6/1966 | Halco | 206—52 X |
| 3,289,969 | 12/1966 | Purbaugh | 242—107.3 |

WILLIAM S. BURDEN, *Primary Examiner.*